United States Patent
Yabe

(10) Patent No.: US 8,965,184 B2
(45) Date of Patent: Feb. 24, 2015

(54) VIDEO-RECORDING/REPRODUCING APPARATUS AND VIDEO-RECORDING/REPRODUCING METHOD

(75) Inventor: Toshiharu Yabe, Tokyo (JP)

(73) Assignee: Sony Corporation, Tokyo (JP)

(*) Notice: Subject to any disclaimer, the term of this patent is extended or adjusted under 35 U.S.C. 154(b) by 1672 days.

(21) Appl. No.: 12/174,911

(22) Filed: Jul. 17, 2008

(65) Prior Publication Data

US 2009/0022480 A1 Jan. 22, 2009

(30) Foreign Application Priority Data

Jul. 19, 2007 (JP) ................................ P2007-188178

(51) Int. Cl.
| | | |
|---|---|---|
| H04N 5/76 | (2006.01) | |
| H04N 5/765 | (2006.01) | |
| H04N 5/781 | (2006.01) | |
| H04N 5/91 | (2006.01) | |
| H04N 9/806 | (2006.01) | |
| H04N 9/82 | (2006.01) | |

(52) U.S. Cl.
CPC .................. H04N 5/76 (2013.01); *H04N 5/765* (2013.01); *H04N 5/781* (2013.01); *H04N 5/91* (2013.01); *H04N 9/8063* (2013.01); *H04N 9/8205* (2013.01); *H04N 9/8227* (2013.01)
USPC ......................................... 386/331; 386/234

(58) Field of Classification Search
USPC ................................................ 386/234, 331
See application file for complete search history.

(56) References Cited

U.S. PATENT DOCUMENTS

| | | | | |
|---|---|---|---|---|
| 2002/0188945 | A1* | 12/2002 | McGee et al. | 725/39 |
| 2004/0060062 | A1* | 3/2004 | Shioya | 725/39 |
| 2006/0129547 | A1* | 6/2006 | Yamamoto et al. | 707/5 |
| 2007/0124752 | A1* | 5/2007 | Sakai | 725/8 |
| 2008/0112690 | A1* | 5/2008 | Shahraray et al. | 386/124 |

FOREIGN PATENT DOCUMENTS

| | | |
|---|---|---|
| JP | 2004-80476 | 3/2004 |
| JP | 2005-303743 | 10/2005 |
| JP | 2006-279290 | 10/2006 |

OTHER PUBLICATIONS

Notification of Reasons for Refusal issued on Apr. 28, 2009, in corresponding Japanese Patent Application No. 2007-188178 and English-language translation.
Nobuyoshi Kodera, "No. 223: Recording of terrestrial analog broadcasting exhaustively, Sony "X video station" . . . type X is divided reasonably" Electric Zoom a! (Oct. 5, 2005).

* cited by examiner

*Primary Examiner* — Vikkram Bali
*Assistant Examiner* — Tracy Mangialaschi
(74) *Attorney, Agent, or Firm* — Finnegan, Henderson, Farabow, Garrett & Dunner, L.L.P.

(57) ABSTRACT

A video-recording/reproducing apparatus and a video-recording/reproducing method making it possible to grasp the outline of a content in a frame using caption data are provided. A storage unit for storing content data containing video data and caption data correlated with each other by time information, a caption string acquisition unit for acquiring a caption string contained in the caption data, a time acquisition unit for acquiring time information corresponding to the caption string, a video acquisition unit for acquiring sequentially video information, from the video data, corresponding to the time information of the caption string acquired by the time acquisition unit, and a display control unit for displaying by thumbnails the video information acquired by the video acquisition unit in time series in a frame on a display unit are included.

9 Claims, 6 Drawing Sheets

VIDEO-RECORDING/REPRODUCING APPARATUS AND VIDEO-RECORDING/REPRODUCING METHOD

CROSS-REFERENCE TO RELATED APPLICATION

The present invention contains subject matter related to Japanese Patent Application JP 2007-188178 filed in the Japan Patent Office on Jul. 19, 2007, the entire contents of which being incorporated herein by reference.

BACKGROUND OF THE INVENTION

1. Field of the Invention

The present invention relates to a video-recording/reproducing apparatus and a video-recording/reproducing method.

2. Description of the Related Art

A recording (video-recording)/reproducing apparatus has a recording medium such as a hard disk drive (HDD), records video information such as TV broadcast program and content recorded on an optical disk medium such as DVD, and reproduces the content recorded on the HDD.

There are recording/reproducing apparatuses having a function of displaying by thumbnails a part of video data such as the broadcast program and the content recorded on a recording medium of the recording/reproducing apparatus. With thumbnail display, the user may easily select the data desired to be reproduced from multiple data recorded.

Signals of TV broadcast and content include video data signal and audio data signal, and may further include caption data signal. Among the caption data, those which can selectively be displayed or hidden are called closed caption. The caption data include, for example, Japanese subtitle, title of the TV program and credit titles. A technology of generating thumbnail display of a content based on the recorded video data and audio data is disclosed in JP-A-2005-303743.

SUMMARY OF THE INVENTION

Incidentally, as thumbnail display by recording/reproducing apparatus, the following display methods may be given as examples.

(1) First, there is a method of displaying by thumbnails multiple still picture images for a content on a screen. With this display method, multiple scenes contained in a content may be reviewed in a screen.

(2) Also, there is a method of displaying one still picture image for a content on a screen as a thumbnail. With this display method, one still picture image of the content may be reviewed, for a content, with the title relating to the content, explanation of the content, and information on casts displayed together.

(3) Furthermore, there is a method for listing multiple contents in a screen by displaying one still picture image representing the respective content for each of the multiple contents by thumbnails. With this display method, respective still picture images of multiple contents may be reviewed in a screen making it easier for the user to select a content to be reproduced among multiple contents.

JP-A-2005-303743 relates to the thumbnail display of (1) as described above, and it displays multiple still picture images with caption data in a content, thereby making it easy to grasp recorded broadcast program.

On the other hand, the thumbnail displays of (2) and (3) as described above generally display one still picture image for a content. Here, there are cases where the one still picture image is selected randomly irrespective of the details of the content, or an image with high priority in the content is selected. Thus, with these thumbnail displays, the user needed to guess the details of the content from one still picture image, and thus, gist of the content, for example, were hard to obtain.

The present invention addresses the above-described issues, and provides a new and improved video-recording/reproducing apparatus and a new and improved video-recording/reproducing method, with which, by using caption data, grasping of the outline of a content in a frame is made possible.

According to an embodiment of the present invention, there is provided a video-recording/reproducing apparatus including a storage unit for storing content data containing video data and caption data correlated with each other by time information, a caption string acquisition unit for acquiring a caption string contained in the caption data, a time acquisition unit for acquiring time information corresponding to the caption string, a video acquisition unit for acquiring sequentially video information, from the video data, corresponding to the time information of the caption string acquired by the time acquisition unit, and a display control unit for displaying by thumbnails the video information acquired by the video acquisition unit in time series in a frame on a display unit.

With such configuration, the storage unit stores content data containing video data and caption data correlated with each other by time information, the caption string acquisition unit acquires a caption string contained in the caption data, the time acquisition unit acquires time information corresponding to the caption string, the video acquisition unit acquires sequentially video information, from the video data, corresponding to the time information of the caption string acquired by the time acquisition unit, and the display control unit displays by thumbnails the video information acquired by the video acquisition unit in time series in a frame on a display unit. Thus, the video information is acquired based on the caption data and the video information is displayed by thumbnails in time series in a frame so that the outline of the content may be grasped.

The time acquisition unit may acquire the display start time of the caption string, and the video acquisition unit may acquire the video information corresponding to the display start time of the caption string acquired by the time acquisition unit. With such configuration, when a caption string is to be displayed over multiple video information, the video acquisition unit acquires the video information corresponding to the display start time of the caption string.

The video-recording/reproducing apparatus may include a metadata string acquisition unit for acquiring metadata string from metadata relating to the content data, and the caption string acquisition unit may acquire the caption string identical or similar to at least a part of the metadata string. With such configuration, in the caption string acquisition unit, the caption string identical or similar to at least a part of the metadata string is acquired.

The metadata may be an electronic program guide data containing information relating to the content data. With such configuration, the caption string identical or similar to at least a part of the string contained in the electronic program guide data is acquired.

The caption string acquisition unit may acquire the caption string by morphologically analyzing the caption data. Also, the metadata string acquisition unit may acquire the metadata string by morphologically analyzing the metadata. With such configuration, the caption string or the metadata string may be extracted by morphological analysis.

The video-recording/reproducing apparatus may include a weighting unit for weighting the caption string, acquired by the caption string acquisition unit, by setting attribute of the caption string, and the time acquisition unit may acquire time information of weighted caption string. With such configuration, in the video acquisition unit, the video information corresponding to the weighted caption string is acquired.

The video-recording/reproducing apparatus may include a similarity calculation unit for calculating similarity between the caption string acquired by the caption string acquisition unit and the metadata string acquired by the metadata string acquisition unit, and the time acquisition unit may acquire display start time of the caption string acquired by the caption string acquisition unit where the similarity calculated by the similarity calculation unit exceeds a predetermined threshold. With such configuration, when the similarity between the caption-string and the metadata string exceeds the predetermined value, the video information corresponding to such caption string is acquired by the video acquisition unit.

The video-recording/reproducing apparatus may include a weighting unit for weighting the caption string, acquired by the caption string acquisition unit, by setting attribute of the caption string, and the similarity calculation unit may calculate the similarity between the weighted caption string and the metadata string acquired by the metadata string acquisition unit. With such configuration, the similarity between the weighted caption string and the metadata string is calculated, and in the video acquisition unit, the video information corresponding to the weighted caption string is acquired.

The display control unit may display by thumbnails the video information acquired by the video acquisition unit in time series in a predetermined time interval in a frame on a display unit. With such configuration, the video information acquired by the video acquisition unit is displayed by thumbnails in time series in a predetermined time interval in a frame on a display unit.

Furthermore, according to another embodiment of the present invention, there is provided a video-recording/reproducing method including the steps of storing content data containing video data and caption data correlated with each other by time information, acquiring caption string contained in the caption data, acquiring time information corresponding to the caption string, acquiring sequentially video information, from the video data, corresponding to the time information of the caption string, and displaying by thumbnails the acquired video information in time series in a frame on a display unit.

According to the present invention, the outline of the content may be grasped in a frame by using the caption data.

DETAILED DESCRIPTION OF THE PREFERRED EMBODIMENTS

Figure 1:
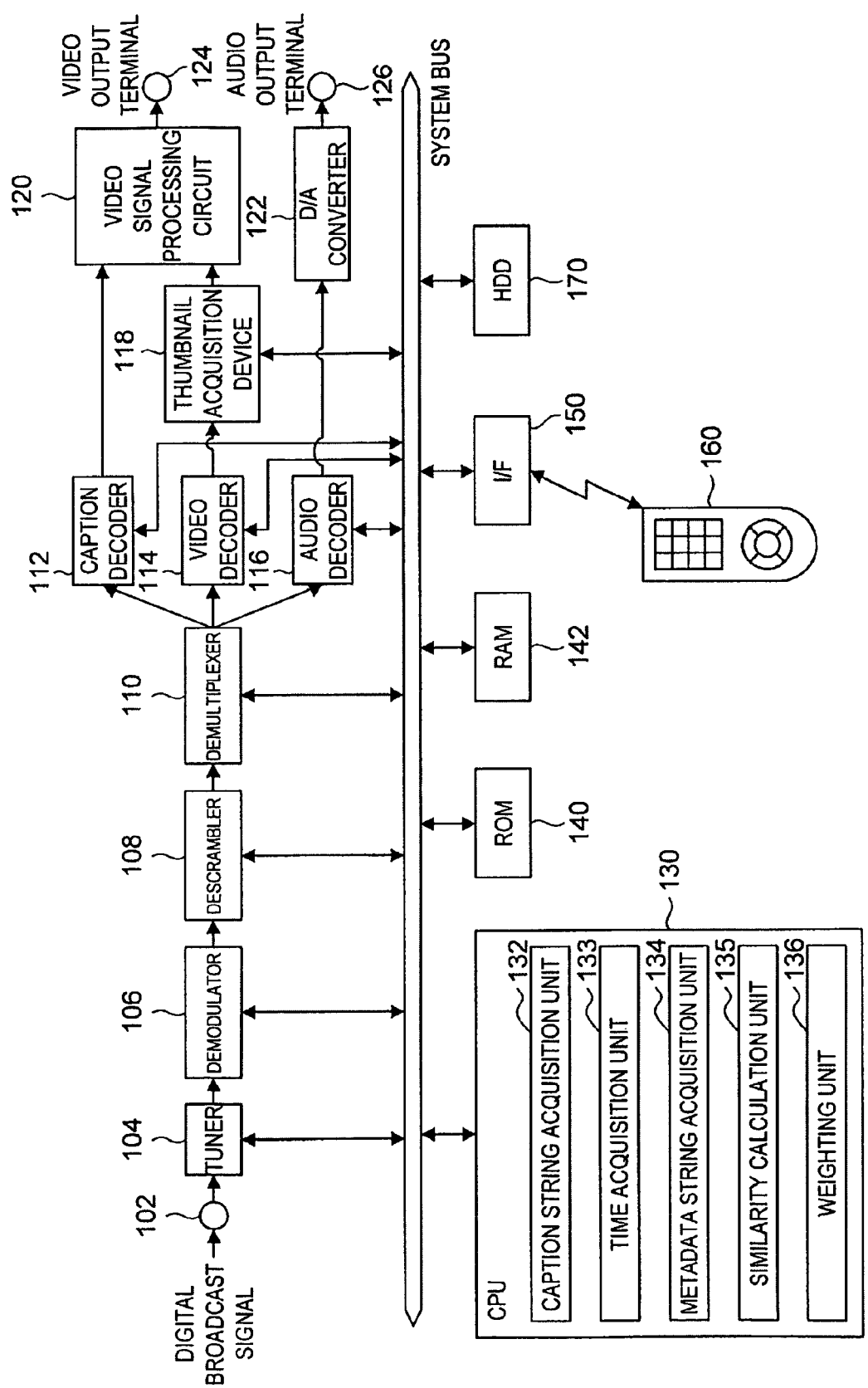
FIG. 1 is a block diagram showing a video-recording/reproducing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First, a video-recording/reproducing apparatus 100 according to an embodiment of the present invention will be explained. FIG. 1 is a block diagram showing the video-recording/reproducing apparatus 100 according to the embodiment.

The video-recording/reproducing apparatus 100 is an example of the recording/reproducing apparatus and is an independent apparatus separately configured from a display device, for example. The video-recording/reproducing apparatus 100 can record TV broadcast on a recording medium such as HDD 170, and reproduce the recorded data. The video-recording/reproducing apparatus 100 can, for example, receive electronic program guide (EPG) data, and display the EPG (broadcast program listing) on a display device (not shown). At that time, thumbnail display can be performed using video data. As shown in FIG. 1, the video-recording/reproducing apparatus 100 includes a tuner 104, a demodulator 106, a descrambler 108, a demultiplexer 110, decoders 112, 114, 116, a thumbnail acquisition device 118, a video signal processing circuit 120, and a D/A converter 122. The video-recording/reproducing apparatus 100 further includes a CPU (Central Processing Unit) 130, a ROM (Read Only Memory) 140, a RAM (Random Access Memory) 142, an I/F 150, and a HDD (Hard Disk Drive) 170.

Incidentally, the video-recording/reproducing apparatus 100 may be applied to and built in a TV receiver for receiving TV broadcast signal. Further, the video-recording/reproducing apparatus 100 may be applied to a personal computer, for example.

The tuner 104 receives broadcast signal of digital broadcast (BS, CS, ground wave) via antenna wire/broadcast I/F 102 (interface). By providing the tuner 104 in the video-recording/reproducing apparatus 100, it becomes possible to watch TV broadcast received via the antenna wire. Incidentally, the video-recording/reproducing apparatus 100 and the tuner 104 are not restricted to be an all-in-one type, and can be separate component devices. The demodulator 106 demodulates TV broadcast signal received by the tuner 104. When the received signal is a broadcast signal scrambled for security, the descrambler 108 recovers it to a normal signal.

Incidentally, the video-recording/reproducing apparatus 100 is not restricted to be provided the tuner 104, and a communication processing unit (not shown) capable of receiving TV broadcast by IP broadcast may be provided therein. Here, the communication processing unit performs communication control according to protocol such TCP/IP, and receives signals relating to content data transmitted from a distribution server via a communication I/F (interface). Further, the video-recording/reproducing apparatus 100 receives EPG data transmitted from the distribution server via the communication processing unit.

The demultiplexer 110 receives the demodulated signals from the tuner 104, and separates signals such as video, audio, subtitle and PSI (Program Specific Information)/SI (Service Information) from the received signals. Further, the demultiplexer 110 separates EIT (Event Information Table) relating to the EPG from the received signals.

The decoders 112, 114, 116 decode the demultiplexed signals. The decoders 112, 114, 116 are a caption decoder 112 for decoding caption data, a video decoder 114 for decoding video data, and an audio decoder 116 for decoding audio data, and the like.

The thumbnail acquisition device 118 is an example of the video acquisition unit, and receives video data signal from the video decoder 114, and generate a thumbnail image whose data size is smaller than the normal image size. The thumbnail acquisition device 118 outputs the signal of the generated thumbnail image to the video signal processing circuit 120. The thumbnail acquisition device 118 acquires sequentially the video information corresponding to the time information, for example, display start time, of the caption string acquired by a time acquisition unit 133.

The video signal processing circuit 120 reproduces data based on the caption data signal and the video signal decoded by the caption decoder 112 and the video decoder 114 or synthesizes display data such as EPG to generate data which can be viewed by the user on the display device. The video signal processing circuit 120 is an example of the display control unit. The data generated by the video signal processing circuit 120 is output to the display device via a video output terminal 124. The video signal processing circuit 120 displays by thumbnails the video information acquired by the video acquisition unit in time series in a frame displayed on the display device.

The D/A converter 122 converts the audio data signal decoded by the audio decoder 116 from digital signal into analog signal, and outputs the signal to an audio output device (not shown) via an audio output terminal 126.

The CPU 130 functions as a processing device and a control device according to the program, and can control each constituent element provided in the video-recording/reproducing apparatus 100, such as the decoders 112, 114, 116, and the thumbnail acquisition device 118. The CPU 130 performs control of the various applications such as browser activated in the video-recording/reproducing apparatus 100, control of receiving the broadcast signal, accumulation control of preserving the received content data in the HDD 170, and reproduction control of reproducing the content data stored in the HDD 170. Further, the CPU 130 includes a caption string acquisition unit 132, a time acquisition unit 133, a metadata string acquisition unit 134, a similarity calculation unit 135, and a weighting unit 136.

The caption string acquisition unit 132 acquires the caption string contained in the caption data by, for example, morphological analysis. The caption string acquisition unit 132 acquires the caption string identical or similar to at least a part of the metadata string.

The time acquisition unit 133 acquires the time information corresponding to the caption string acquired by the caption string acquisition unit 132, for example, the display start time of the caption string. The time acquisition unit 133 outputs the time information to the thumbnail acquisition device 118. The time acquisition unit 133 may acquire the time information of the caption string weighted by the weighting unit 136. When similarity calculation is performed, the time acquisition unit 133 acquires the time information of the caption string acquired by the caption string acquisition unit 132 where the similarity calculated by the similarity calculation unit exceeds a predetermined threshold.

The metadata string acquisition unit 134 acquires the metadata string from metadata relating to the content data by, for example, morphological analysis. For example, the metadata is EPG (electronic program guide) data, and the metadata string acquisition unit 134 acquires strings such as title and program details from the EPG data.

The similarity calculation unit 135 calculates the similarity between the caption string acquired by the caption string acquisition unit 132 and the metadata string (e.g., EPG string) acquired by the metadata string acquisition unit 134. In the similarity calculation, keyword group contained in the respective caption string and EPG string are regarded as vectors (keyword vector), and the cosine (cos θ) of the vectors is calculated. The result of the calculated cosine is regarded as the similarity, and is regarded as the calculation result.

For example, the keyword groups of the caption string and the EPG string (in case of proper nouns contained in program information) are as in the following Table.

TABLE 1

| Caption string | 4.0: Japan | 3.0: China | | |
| EPG string | 4.0: Japan | 2.0: U.S.A | 2.0: France | 1.0: Italy |

Here, in "4.0: Japan", for example, before the colon (:) is the score, and after the colon is the keyword. The score is determined depending on the appearance frequency.

The similarity between the caption string and the EPG string is calculated from the cosine between the keyword vectors of the caption string and the EPG string as shown in the following Equations.

$$\cos\theta = \frac{A \cdot B}{|A||B|} = \frac{4.0 \times 4.0 (\text{Japan})}{5.0 \times 5.0} = 0.64 (\text{similarity}) \quad \text{[Equation 1]}$$

Here, $$|A| = \sqrt{4.0 \times 4.0 + 3.0 \times 3.0} = 5.0$$

$$|B| = \sqrt{4.0 \times 4.0 + 2.0 \times 2.0 + 2.0 \times 2.0 + 1.0 \times 1.0} = 5.0 \quad \text{[Equation 2]}$$

The cosine of the keyword vectors of the caption string and the EPG string is the similarity between the caption string and the EPG string.

The weighting unit 136 weights the caption string, acquired by the caption string acquisition unit 132, by setting attribute of the caption string, for example, by coloring the caption string. Thus, the time acquisition unit 133 may acquire the time information of the weighted caption string, or the similarity calculation unit 135 may use the weighted string for similarity calculation.

The ROM 140 stores the program and the processing parameters and the like to be used by the CPU 130. The RAM 142 primarily stores the program used at the time of execution by the CPU 130, and the parameters changeable in the execution, and the like. The I/F 150 inputs and outputs the signals between an operating unit 160 and the video-recording/reproducing apparatus 100.

The HDD 170 is an example of the storage unit, and stores the content data and the EPG data, for example.

The operating unit 160 is, for example, a remote controller, and outputs signals relating to operation to the video-recording/reproducing apparatus 100 based on the operation of the user. The operating unit 160 is provided with, for example, direction buttons and ENTER button. Incidentally, the operating unit 160 is not restricted to a remote controller, and may be provided on the video-recording/reproducing apparatus 100.

Figure 2:
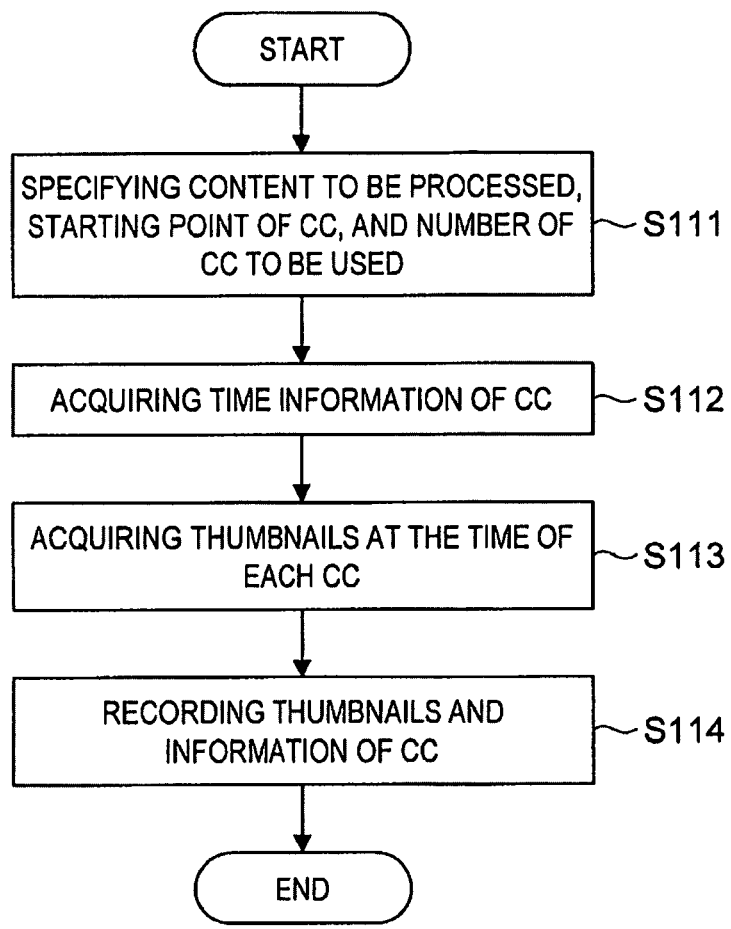
FIG. 2 is a flowchart of generating thumbnails.

Next, the generation of thumbnails will be described with reference to FIG. 2. FIG. 2 is a flowchart of generating thumbnails.

First, among the video-recorded contents, the content for which thumbnails are to be generated is specified, and the starting point of the caption string (CC: closed caption) contained in the caption data of the content data and the number of caption string to be used in the thumbnail display are specified (step S111). Next, the time acquisition unit 133 acquires the time information of the caption string (step S112). Then, the thumbnail acquisition device 118 acquires sequentially the video information (thumbnails) corresponding to the time information of each caption string (step S113). The thumbnails and the information of the caption strings are related and stored in the HDD 170 (step S114).

Figure 3:
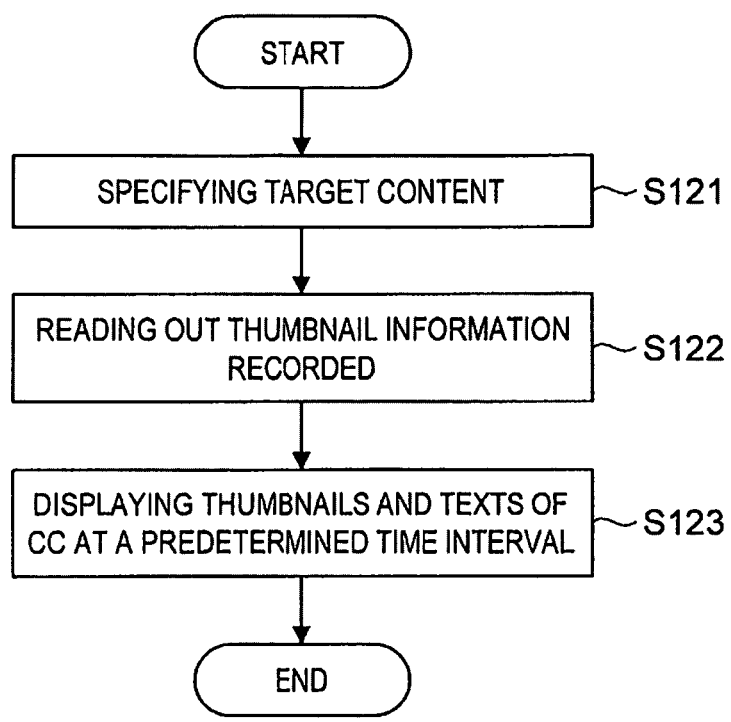
FIG. 3 is a flowchart of displaying thumbnails.

Next, the displaying of the thumbnails will be described with reference to FIG. 3. FIG. 3 is a flowchart of displaying thumbnails.

Figure 6:
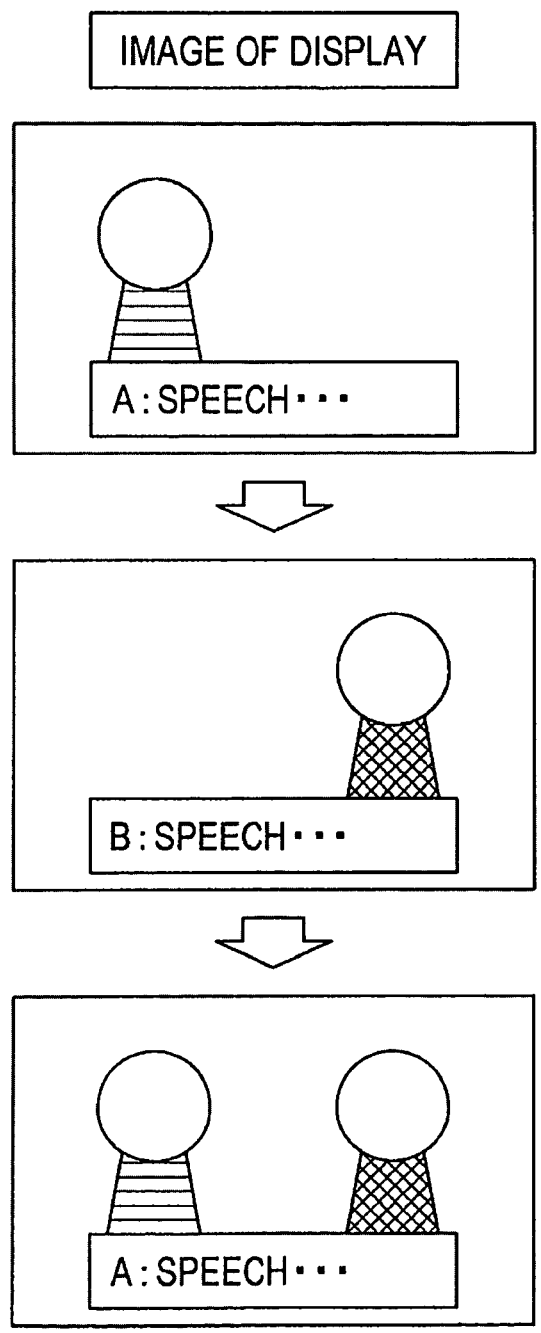
FIG. 6 is an explanatory diagram showing thumbnail display.

First, target content whose thumbnails are to be displayed is specified from the list of the video-recorded contents displayed on the screen of the display device (step S121). At that time, content may be selected from the EPG. Next, the thumbnail acquisition device 118 reads out the thumbnail information recorded on the HDD 170 (step S122). Then, the video signal processing circuit 120 displays the thumbnails in time series in a predetermined interval in a frame on a display device (step S123). At that time, the thumbnail and the caption string may be displayed simultaneously, or keyword in the caption string may be emphasized (highlighted) or only the keyword in the caption string may be displayed. The image of how the thumbnails are displayed in time series in a frame is shown in FIG. 6, for example. FIG. 6 is an explanatory diagram showing thumbnail display.

Figure 4:
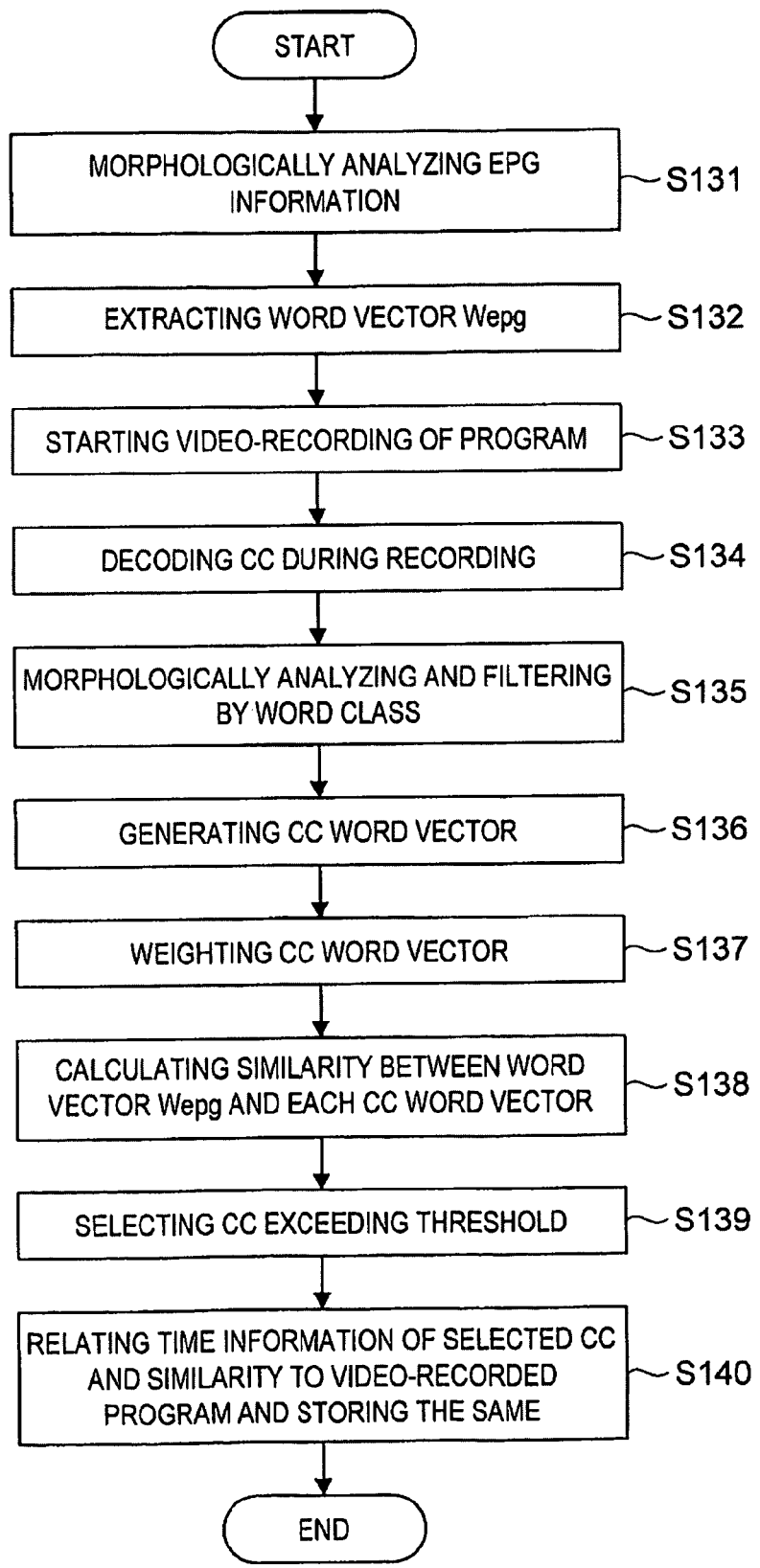
FIG. 4 is an explanatory diagram showing a process of relating thumbnails and EPG.

Next, a process of relating the thumbnails and the EPG will be described with reference to FIG. 4. FIG. 4 is an explanatory diagram showing a process of relating the thumbnails and the EPG.

First, the metadata string acquisition unit 134 morphologically analyzes the EPG data relating to broadcast program (step S131). Then, the metadata string acquisition unit 134 extracts a word vector Wepg (step S132). The elements of the vector are set, for example, "1" for a word existing in the EPG data, and "0" for the other words. Next, video-recording of the program is started (step S133). Incidentally, the steps S131 and S132 described above may be performed after video-recording.

The caption decoder 112 decodes the caption data during video-recording (step S134). The caption string acquisition unit 132 morphologically analyzes the caption data of the video-recoded content data, and performs filtering based on the word class, such as noun and verb (step S135). Then, the caption string acquisition unit 132 generates a word vector Wccn (n=1, 2, . . . ) with a caption string to which time information is added as one unit (step S136). Here, the elements of the vector are based on the values of weighting described later.

Next, the word vector Wccn is weighted (step S137). The weighting is performed by coloring the caption string, for example. In many cases, the caption string colored by other than white is considered important. For example, there are contents in which different colors are used for different characters. Thus, with this attribute, the weighting may be performed on the caption string by providing colors other than white. For example, yellow color is weighted 3 times, blue color 2 times, white color 1 time, and 1.5 times for other colors.

Next, the similarity calculation unit 135 calculates the similarity between the word vector Wepg and the word vector Wccn of each caption string (step S138). The caption string acquisition unit 132 acquires the caption string where the similarity calculated by the similarity calculation unit exceeds a predetermined threshold (step S139). In response, the time acquisition unit 133 acquires the display start time of the acquired caption string. Then, the display start time of the acquired caption string and the similarity and the like are related to the video-recorded content and stored in the HDD 170.

Figure 5:
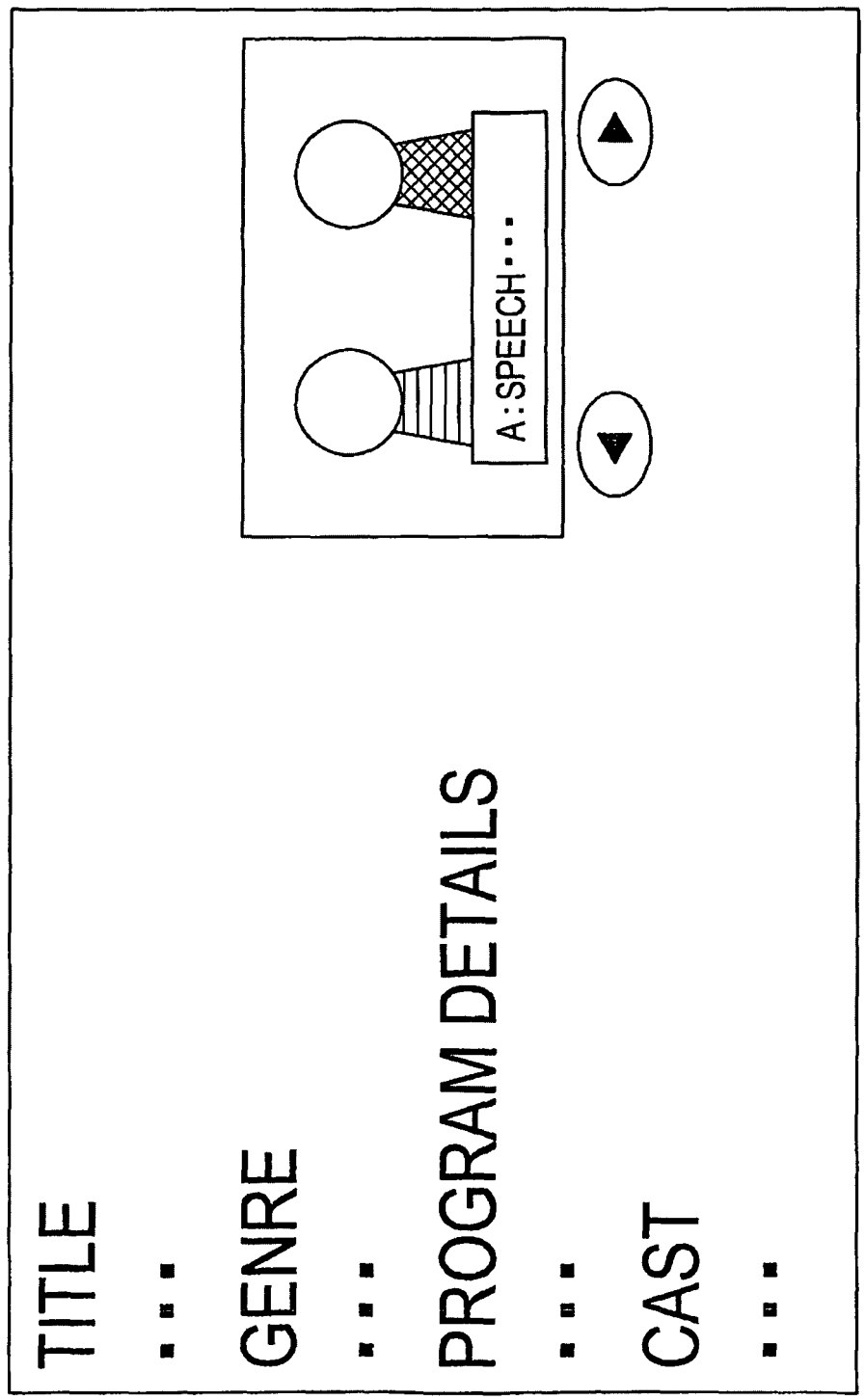
FIG. 5 is an explanatory diagram showing a thumbnail and EPG display.

As a result, as shown in FIG. 5, thumbnails may be displayed together with the information contained in the EPG, such as title, genre, program details, and casts. Here, for thumbnail display, thumbnails corresponding to the display start time of the caption string recorded on the HDD are used, and the thumbnails are displayed in time series in a frame. Here, the thumbnails are displayed sequentially in time series in a time interval of 5 seconds from the display start time of the caption string, for example. After 30 seconds, it may be made to return to the initial time. Further, by the operation of the user (direction buttons as shown in FIG. 5), candidates for the thumbnails to be displayed before and after in time series may be displayed.

It should be understood by those skilled in the art that various modifications, combinations, sub-combinations and alterations may occur depending on design requirements and other factors insofar as they are within the scope of the appended claims or the equivalents thereof.

For example, in the embodiment as described above, thumbnail display for displaying thumbnail together with the EPG information has been explained. However, the present invention is not restricted to such case. For example, video information acquired by the video acquisition unit of the present invention may be used for digest reproduction.

Further, in the present invention, a method for determining the caption string to be used at the time of generating thumbnails may be arbitrary. For example, by using music detection technology, caption strings of the scene where theme music is being played in a drama may be used, or by using highlight detection technology, caption strings of the scoring scene in a sports program showing soccer and the like.

What is claimed is:

1. A video-recording/reproducing apparatus, comprising:
    a storage unit for storing content data containing video data and caption data correlated with each other by time information and for storing metadata relating to and provided separately from the content data;
    a caption string acquisition unit for acquiring a caption string contained in said caption data;
    a metadata string acquisition unit for acquiring a metadata string from the metadata, wherein said caption string acquisition unit acquires said caption string based on a similarity to at least a part of said metadata string;
    a time acquisition unit for acquiring time information corresponding to said caption string;
    a video acquisition unit for acquiring sequentially video information, from said video data, corresponding to said time information of said caption string acquired by said time acquisition unit;
    a display control unit for displaying by thumbnails said video information acquired by said video acquisition unit in time series in a frame on a display unit; and
    a similarity calculation unit for calculating similarity between said caption string acquired by said caption string acquisition unit and said metadata string acquired by said metadata string acquisition unit, wherein
    said time acquisition unit acquires display start time of said caption string acquired by said caption string acquisition unit where the similarity calculated by said similarity calculation unit exceeds a predetermined threshold.

2. The video-recording/reproducing apparatus according to claim 1, wherein
said time acquisition unit acquires display start time of said caption string; and
said video acquisition unit acquires video information corresponding to said display start time of said caption string acquired by said time acquisition unit.

3. The video-recording/reproducing apparatus according to claim 1, wherein said metadata is an electronic program guide data containing information relating to said content data.

4. The video-recording/reproducing apparatus according to claim 1, wherein said caption string acquisition unit acquires said caption string by morphologically analyzing said caption data.

5. The video-recording/reproducing apparatus according to claim 1, wherein said metadata string acquisition unit acquires said metadata string by morphologically analyzing said metadata.

6. The video-recording/reproducing apparatus according to claim 1,
comprising:
a weighting unit for weighting said caption string, acquired by said caption string acquisition unit, by setting attribute of said caption string, wherein
said time acquisition unit acquires time information of weighted caption string.

7. The video-recording/reproducing apparatus according to claim 1, comprising:
a weighting unit for weighting said caption string, acquired by said caption string acquisition unit, by setting attribute of said caption string, wherein said similarity calculation unit calculates the similarity between said weighted caption string and said metadata string acquired by said metadata string acquisition unit.

8. The video-recording/reproducing apparatus according to claim 1, wherein said display control unit displays by thumbnails said video information acquired by said video acquisition unit in time series in a predetermined time interval in a frame on a display unit.

9. A video-recording/reproducing method, comprising the steps of:
storing content data containing video data and caption data correlated with each other by time information;
storing metadata relating to and provided separately from the content data;
acquiring metadata string from the metadata;
acquiring caption string contained in said caption data, wherein said caption string is acquired based on a similarity to at least a part of said metadata string;
calculating similarity between said acquired caption string and said acquired metadata string;
acquiring time information corresponding to said caption string;
displaying a start time of said acquired caption string acquired where the calculated similarity exceeds a predetermined threshold;
acquiring sequentially video information corresponding to said time information of said caption string from said video data; and
displaying by thumbnails said acquired video information in time series in a frame on a display unit.

* * * * *